Figure 1:
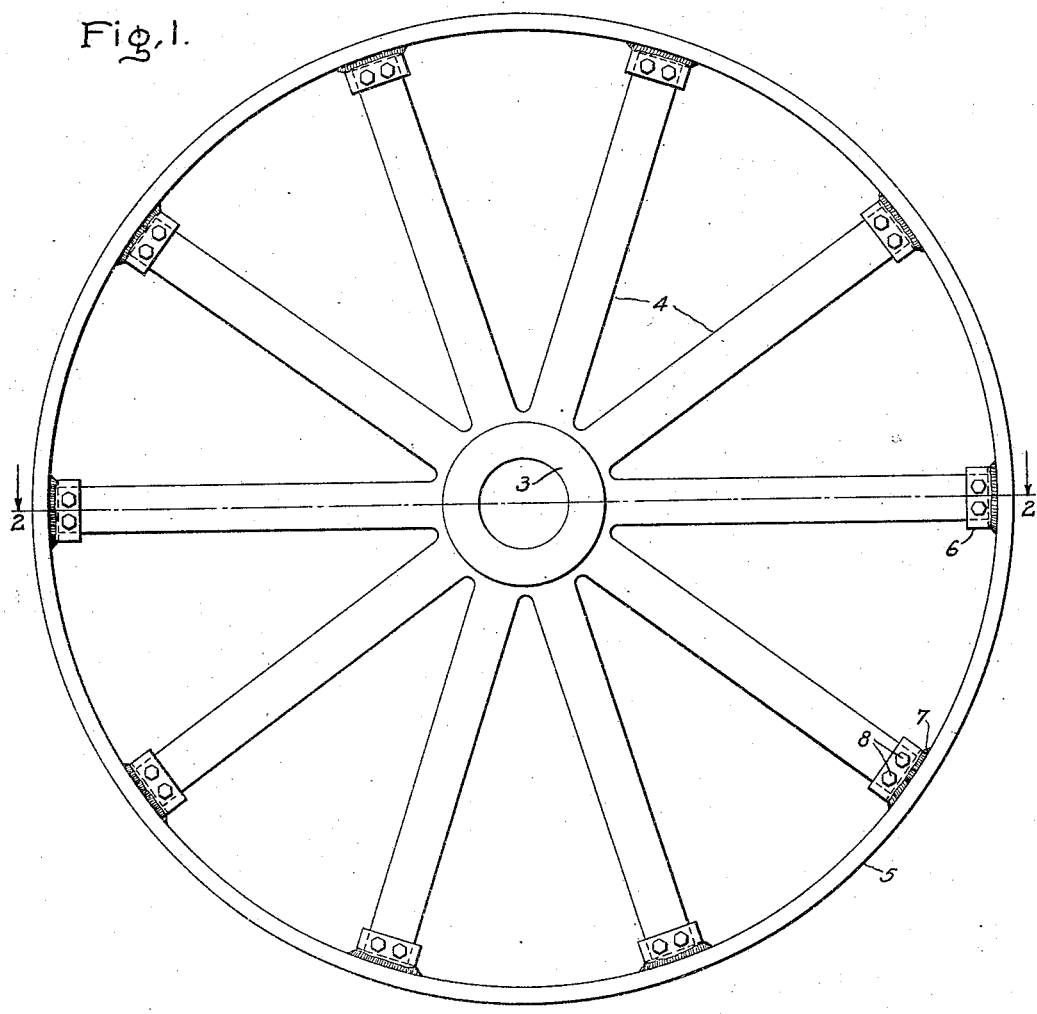

March 21, 1933. W. E. JOHNSON 1,902,505
FLYWHEEL
Filed April 22, 1932

Inventor:
Wilfrid E. Johnson,
by Charles E. Tullar
His Attorney.

Patented Mar. 21, 1933

1,902,505

UNITED STATES PATENT OFFICE

WILFRID E. JOHNSON, OF SCHENECTADY, NEW YORK, ASSIGNOR TO GENERAL ELECTRIC COMPANY, A CORPORATION OF NEW YORK

FLYWHEEL

Application filed April 22, 1932. Serial No. 606,892.

The present invention relates to flywheels and the like rotatable members having a plurality of arms or spokes and an outer portion, such as a rim in the case of a flywheel, fastened to the arms or spokes.

Great centrifugal forces are set up in members of this character during their rotation, causing expansion of the different parts. As the centrifugal force of a rotated element is proportional to the radius of rotation it can easily be seen that in a flywheel the centrifugal force of the rim is relatively greater than that of the inner portions or spokes. These forces tend to cause different expansions of the different parts. In a flywheel the centrifugal force acting on the rim tends to cause greater expansion than the centrifugal force acting on the spokes, and unless the rim is free to expand, high bending stresses are set up in the rim portions between adjacent arms, reaching maximum values near the arms.

The object of my invention is to provide an improved construction for flywheels and like rotatable members with the outer portion or rim rigidly secured to the arms or spokes, in which the rim or outer portion is free to expand during rotation.

My invention is based on the physical facts that the stretch or expansion of a material subject to centrifugal force is proportional to its density or specific weight and inversely proportional to its modulus of elasticity; in other words, the expansion of an element rotated about an axis depends upon the ratio $\frac{E}{\rho}$ in which E represents the modulus of elasticity and $\rho$ the density of the material forming the element, that is, the expansion or stretch increases with decreasing ratio of $\frac{E}{\rho}$.

Let us now consider two elements rotated at different radii about an axis of rotation. If the elements are of the same material, it is clear that the element rotated at the larger radius stretches or expands more than that rotated at a smaller radius. The outer element, that is, the element rotating at larger radius, is prevented from freely expanding in the case of a flywheel in which the outer element or rim is rigidly fastened to the inner elements or spokes. In order to permit free expansion of the outer element or rim in a rotatable member such as a flywheel, I make the spokes or inner elements of a material having a ratio $\frac{E}{\rho}$ less than that of the material forming the rim.

For a better understanding of what I believe to be novel and my invention, attention is directed to the following description and the claims appended thereto in connection with the drawing which forms a part of my specification.

Figure 2:
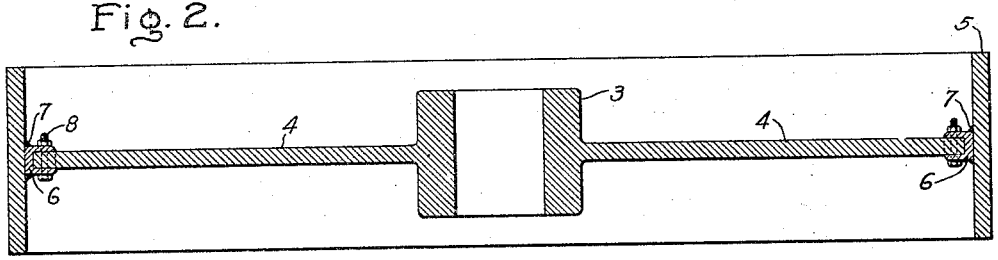

In the drawing, where I have shown by way of example a flywheel, Fig. 1 is a front view and Fig. 2 a sectional view along lines 2—2 of Fig. 1.

Referring to the drawing, 3 is a hub, 4 designates a plurality of spokes integrally united with the hub, 5 is the rim rigidly fastened to the spokes by any suitable means, in the present instance shown as comprising blocks or brackets 6 welded or soldered to the rim, as indicated at 7, and defining openings into which end portions of the spokes 4 are inserted. These end portions are rigidly fastened to the blocks by means of bolts 8.

The flywheel so far described is typical of any kind of flywheel or like rotatable member with the spokes rigidly fastened to the rim. According to my invention, I make the spokes or arms of a metal, such as aluminum bronze for example, having a low modulus of elasticity but relatively high density, whereas the rim or outer portion is made of a material such as high grade steel or the like, having a higher modulus of elasticity. With such an arrangement the low modulus of elasticity and the high density of the material forming the spokes cause a relatively great expansion during rotation, whereas the higher modulus of elasticity and the lower density of the material forming the rim causes relatively lesser expansion during rotation. In other words, the arrangement is such that the tendency to differences in expansion caused by the centrifugal forces, due to the different mean radial distances of these members from the axis of rotation, is compensated owing to the different physical properties of the materials used for said members.

In one embodiment according to my invention I prefer to make the spokes of a size and a material such that they expand under the influence of their own centrifugal force to a size somewhat less than that necessary to permit free expansion of the rim. In order to obtain the additional expansion of the spokes which is necessary to permit free expansion of the rim I make the blocks 6 of proper weight to cause the desired additional expansion.

With my invention I have accomplished a reliable flywheel or like rotating member subject to high centrifugal forces in which bending stresses set up in the different parts and accordingly the danger of explosion of the member are reduced to a minimum.

What I claim as new and desire to secure by Letters Patent of the United States is:

1. A wheel having a plurality of spokes and a rim fastened thereto, the spokes being of a material for which the ratio $\frac{E}{\rho}$ is less than the corresponding ratio for the material forming the rim, E representing the modulus of elasticity and $\rho$ the density of the respective materials.

2. A wheel having a hub, a rim, and means for rigidly fastening the rim to the hub, said means being of a metal for which the ratio $\frac{E}{\rho}$ is less than the corresponding ratio for the metal forming the rim, E representing the modulus of elasticity and $\rho$ the density of the respective metals.

3. A wheel as claimed in claim 1 with members fastened to the outer portions of the spokes for increasing the expansion of the spokes during rotation of the wheel.

4. A rotatable member having a hub, an outer portion, and arms for fastening the outer portion to the hub, the arms being of a metal for which the ratio $\frac{E}{\rho}$ is less than the corresponding ratio for the metal forming the outer portion, E representing the modulus of elasticity and $\rho$ the density of the respective metals.

5. A wheel having a plurality of spokes made of aluminum bronze and a rim rigidly fastened to the spokes and made of high grade steel.

In witness whereof, I have hereunto set my hand.

WILFRID E. JOHNSON.